(12) United States Patent
Schmidt et al.

(10) Patent No.: US 11,708,154 B2
(45) Date of Patent: Jul. 25, 2023

(54) SHAFT DRIVEN SELF-POWERED LANDING GEAR WITH HUBCAP MOUNTED GEAR REDUCTION

(71) Applicants: Safran Landing Systems, Velizy-Villacoublay (FR); Safran Landing Systems Canada Inc., Ajax (CA)

(72) Inventors: Robert Kyle Schmidt, Brooklin (CA); Steve Amberg, Toronto (CA); Didier Brun, Les Alluets le Roi (FR)

(73) Assignees: Safran Landing Systems, Velizy-Villacoublay (FR); Safran Landing Systems Canada Inc., Ajax (CA)

( * ) Notice: Subject to any disclaimer, the term of this patent is extended or adjusted under 35 U.S.C. 154(b) by 109 days.

(21) Appl. No.: 17/147,337

(22) Filed: Jan. 12, 2021

(65) Prior Publication Data

US 2022/0219813 A1 Jul. 14, 2022

(51) Int. Cl.
*F16H 1/28* (2006.01)
*B64C 25/32* (2006.01)
(Continued)

(52) U.S. Cl.
CPC ............ *B64C 25/405* (2013.01); *F16D 11/14* (2013.01); *F16H 1/28* (2013.01); *F16D 27/09* (2013.01);
(Continued)

(58) Field of Classification Search
CPC .................. B64C 25/405; F16D 11/14; F16D 2121/02; F16D 2121/20; F16D 27/02–09; F16H 1/28; F16H 2200/2094; F16H 2200/2064

See application file for complete search history.

(56) References Cited

U.S. PATENT DOCUMENTS

| 2,384,582 A | 9/1945 | Wildhaber |
| 3,613,849 A * | 10/1971 | Pape ...................... F16D 27/06 |
| | | 188/196 P |

(Continued)

FOREIGN PATENT DOCUMENTS

| FR | 2 001 966 | 10/1969 |
| FR | 2 954 236 B1 | 3/2012 |
| JP | 2007-112408 A | 5/2007 |

OTHER PUBLICATIONS

International Search Report and Written Opinion dated Mar. 25, 2022, issued in corresponding International Application No. PCT/CA2022/050029, filed Jan. 11, 2022, 10 pages.

(Continued)

*Primary Examiner* — Charles A Fox
*Assistant Examiner* — Farhana Pervin
(74) *Attorney, Agent, or Firm* — Christensen O'Connor Johnson Kindness PLLC

(57) ABSTRACT

A landing gear system includes wheel rotatably coupled to an axle. A driveshaft extends through a cavity formed in the axle and is rotatable about an axis. A planetary gear includes a sun gear operably coupled to the drive shaft and a planet gear operably engaging the sun gear. The planetary gear further includes a ring gear that surrounds and is operably coupled to the planet gear so that rotation of the drive shaft rotates the ring gear. A clutch assembly is selectively moveable between an engaged state and a disengaged state. The clutch assembly transfers rotation of the ring gear to the wheel when the clutch assembly is in the engaged state, and the clutch assembly does not transfer rotation of the wheel to the ring gear when the clutch assembly is in the disengaged state.

20 Claims, 13 Drawing Sheets

(51) Int. Cl.
   *F16D 11/14* (2006.01)
   *F16D 27/09* (2006.01)
   *F16D 121/20* (2012.01)
   *F16D 121/02* (2012.01)

(52) U.S. Cl.
   CPC ...... *F16D 2121/02* (2013.01); *F16D 2121/20* (2013.01)

(56) References Cited

U.S. PATENT DOCUMENTS

| | | | |
|---|---|---|---|
| 3,711,043 A | 1/1973 | Cameron-Johnson | |
| 3,713,519 A * | 1/1973 | Ruget | F16D 27/02 192/84.95 |
| 6,672,966 B2 | 1/2004 | Muju et al. | |
| 9,540,097 B2 | 1/2017 | Schmidt et al. | |
| 9,751,622 B2 * | 9/2017 | Blanc | B64C 25/405 |
| 11,480,220 B2 * | 10/2022 | Isami | B60K 17/02 |
| 2006/0065779 A1 * | 3/2006 | McCoskey | B64F 1/28 244/100 R |
| 2014/0263832 A1 * | 9/2014 | Schmidt | B64C 25/405 244/102 A |
| 2015/0097078 A1 * | 4/2015 | Mueller | B64C 25/42 244/50 |
| 2015/0345566 A1 * | 12/2015 | Hosokawa | F16D 27/06 192/66.1 |
| 2017/0298996 A1 * | 10/2017 | Mayr | B60K 17/3462 |
| 2018/0170527 A1 * | 6/2018 | Roques | B64C 25/42 |
| 2019/0016446 A1 * | 1/2019 | Cox | B64C 25/405 |
| 2021/0253227 A1 | 8/2021 | Schmidt et al. | |

OTHER PUBLICATIONS

Schmidt, R.K., et al., "Clutch Assembly for Autonomous Taxiing of Aircraft," U.S. Appl. No. 16/793,898, filed Feb. 18, 2020, 24 pages.

* cited by examiner

US 11,708,154 B2

SHAFT DRIVEN SELF-POWERED LANDING GEAR WITH HUBCAP MOUNTED GEAR REDUCTION

BACKGROUND

Autonomous taxiing systems provide drive capabilities to one or more wheels of an aircraft. By utilizing electric or hydraulic motors (or other power sources) to drive the wheels, operators can push back from gates and taxi without having to use their jet engines or tow tractors. As a result, fuel costs, wear and maintenance on the jet engines, and noise are all reduced.

When implementing an autonomous taxiing system, it is desirable to provide a clutch that isolates the driven wheel from the driving mechanism. Ideally, this clutch is arranged such that the autonomous taxi equipment does not introduce any additional rotating failure modes compared to a landing gear without the autonomous taxi equipment. For instance, with the clutch disengaged, there should be no additional rotating bearings, shafts, or other components that could fail and introduce a retarding torque during aircraft acceleration for takeoff.

U.S. Pat. No. 9,540,097, issued to Schmidt et al., ("Schmidt") and currently assigned to Safran Landing Systems, the disclosure of which is expressly incorporated herein, teaches the use of drive shafts housed within the landing gear axle to drive the aircraft wheels. Schmidt generally explains that the drive shafts may be provided with couplers for selectively coupling or uncoupling the drive shafts from the wheels. When the couplers are uncoupled, untimely powering of the motors does not rotate the wheels and does not cause a reaction torque to be applied to the undercarriage if the brakes are engaged.

Autonomous taxiing systems require high torque output to the driven wheels in order to taxi the aircraft. Motors designed to deliver such torques are typically undesirable as being too large and too heavy for use on aircraft. Compact, lightweight motors suitable for use on aircraft tend to have high-speed/low-torque outputs that lack the power needed to drive the aircraft wheels.

SUMMARY

In accordance with an embodiment of the present disclosure, a landing gear system is provided. The landing gear system includes an axle having an internal cavity and a wheel rotatably coupled to the axle. A drive shaft is mounted within the cavity to be rotatable about an axis. The landing gear system further includes a planetary gear assembly having a sun gear operably coupled to the drive shaft and a planet gear operably engaging the sun gear. A ring gear surrounds and is operably coupled to the planet gear such that rotation of the drive shaft rotates the ring gear. A clutch assembly is selectively moveable between an engaged state and a disengaged state. The clutch assembly transfers rotation of the ring gear to the wheel when the clutch assembly is in the engaged state, and the clutch assembly does not transfer rotation of the wheel to the ring gear when the clutch assembly is in the disengaged state.

In any embodiment, the planetary gear assembly further comprises a carrier fixedly positioned relative to the axle, wherein the sun gear and the planet gear are rotatably coupled to the carrier.

In any embodiment, the clutch assembly comprises a first clutch portion associated with the ring gear and a second clutch portion associated with the wheel.

In any embodiment, the first clutch portion is integrally formed with the ring gear.

In any embodiment, the second clutch portion is fixed in rotation relative to wheel.

In any embodiment, the second clutch portion is mounted for translation relative to the first clutch portion.

In any embodiment, the landing gear assembly further includes a plurality of slider assemblies fixedly positioned relative to the wheel, wherein the second clutch portion is slidably mounted to the plurality of slider assemblies.

In any embodiment, each slider assembly comprises a bolt extending through a corresponding hole in the second clutch portion.

In any embodiment, each slider assembly further comprises a spring engaging the second clutch assembly to urge the clutch assembly toward the disengaged state.

In any embodiment, the second clutch portion is fixedly coupled to the wheel.

In any embodiment, the second clutch portion is mounted for translational movement relative to the ring gear.

In any embodiment, the landing gear assembly further includes a plurality of slider assemblies fixedly positioned relative to the ring gear, wherein the second clutch portion is slidably mounted to the plurality of slider assemblies.

In any embodiment, each slider assembly comprises a bolt extending through a corresponding hole in the second clutch.

In any embodiment, each slider assembly further comprises a spring engaging the second clutch assembly to urge the clutch assembly toward the disengaged state.

In accordance with an embodiment of the present disclosure, a landing gear system is provided. The landing gear system includes a drive shaft disposed within an axle housing and rotatable about a first axis. A wheel is rotatably mounted to the axle for rotation about the first axis. The landing gear system further includes a planetary gear assembly, comprising a carrier fixedly coupled to the axle housing; a sun gear coupled to the carrier for rotation about the first axis and engaging the drive shaft, wherein rotation of the drive shaft rotates the sun gear about the first axis; a plurality of planet gears operably engaging the sun gear, each planet gear being mounted to the carrier for rotation about a corresponding planet gear axis parallel to the first axis; and a ring gear coupled to the carrier for rotation about the first axis, the ring gear surrounding and engaging each of the plurality of planet gears, rotation of the drive shaft rotating the ring gear. A clutch assembly selectively engages the ring gear with the wheel.

In any embodiment, the clutch assembly includes a first clutch portion associated with the ring gear and second clutch portion associated with the wheel.

In any embodiment, the first clutch portion is integrally formed with the ring gear, and the second clutch portion is slidingly associated with the wheel, the landing gear assembly further comprising an actuator configured to selectively move the second clutch portion to engage the first clutch portion.

In any embodiment, the first clutch portion is slidably associated with the ring gear, and the second clutch portion is fixedly positioned relative to the wheel, the landing gear assembly further comprising an actuator configured to selectively move the first clutch portion to engage the second clutch portion.

In any embodiment, the landing gear system further includes a first alignment fitting fixedly positioned relative to the first clutch portion and a second alignment fitting fixedly positioned relative to the axle housing, wherein the first alignment fitting engages the second alignment fitting when the clutch assembly moves from a disengaged state to an engaged state.

In any embodiment, the first alignment fitting comprises a first frustoconical surface, and the second alignment fitting comprises a second frustoconical surface, the first frustoconical surface engaging the second frustoconical surface when the clutch assembly is in the engaged state.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of an autonomous taxiing system for an aircraft are set forth below according to technologies and methodologies of the present disclosure. In an embodiment, a drive shaft located within the axle is rotated by a motor mounted to the landing gear. The drive axle rotates to drive a planetary gear assembly having a ring gear that drives the wheel to taxi the aircraft. A clutch assembly selectively engages and disengages the ring gear from the wheel so that the planetary gear assembly is isolated from the wheels when the clutch assembly is in a disengaged state.

Figure 1:
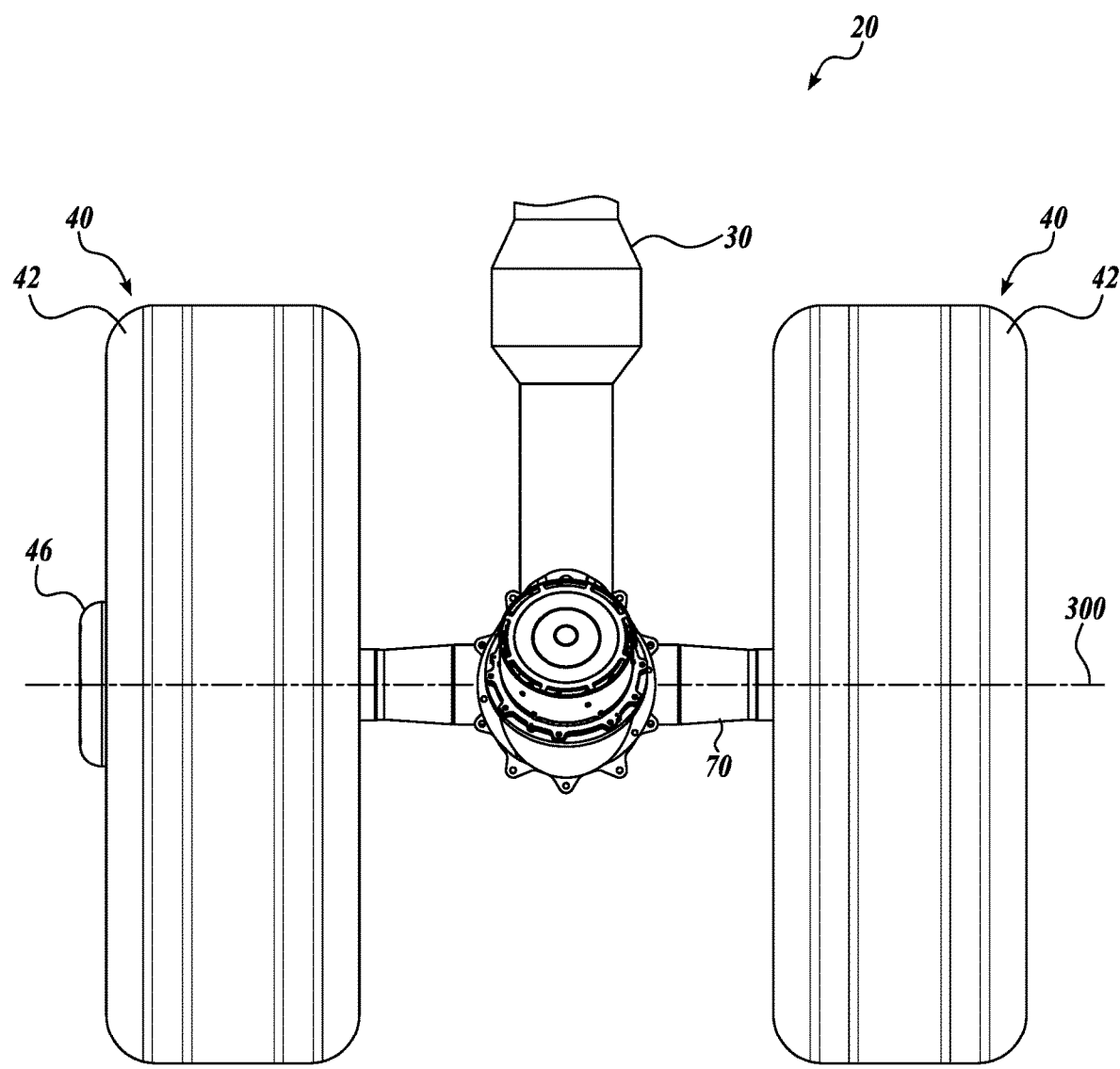
FIG. 1 shows a rear view of a landing gear system according to a first representative embodiment of the present disclosure.
Figure 2:
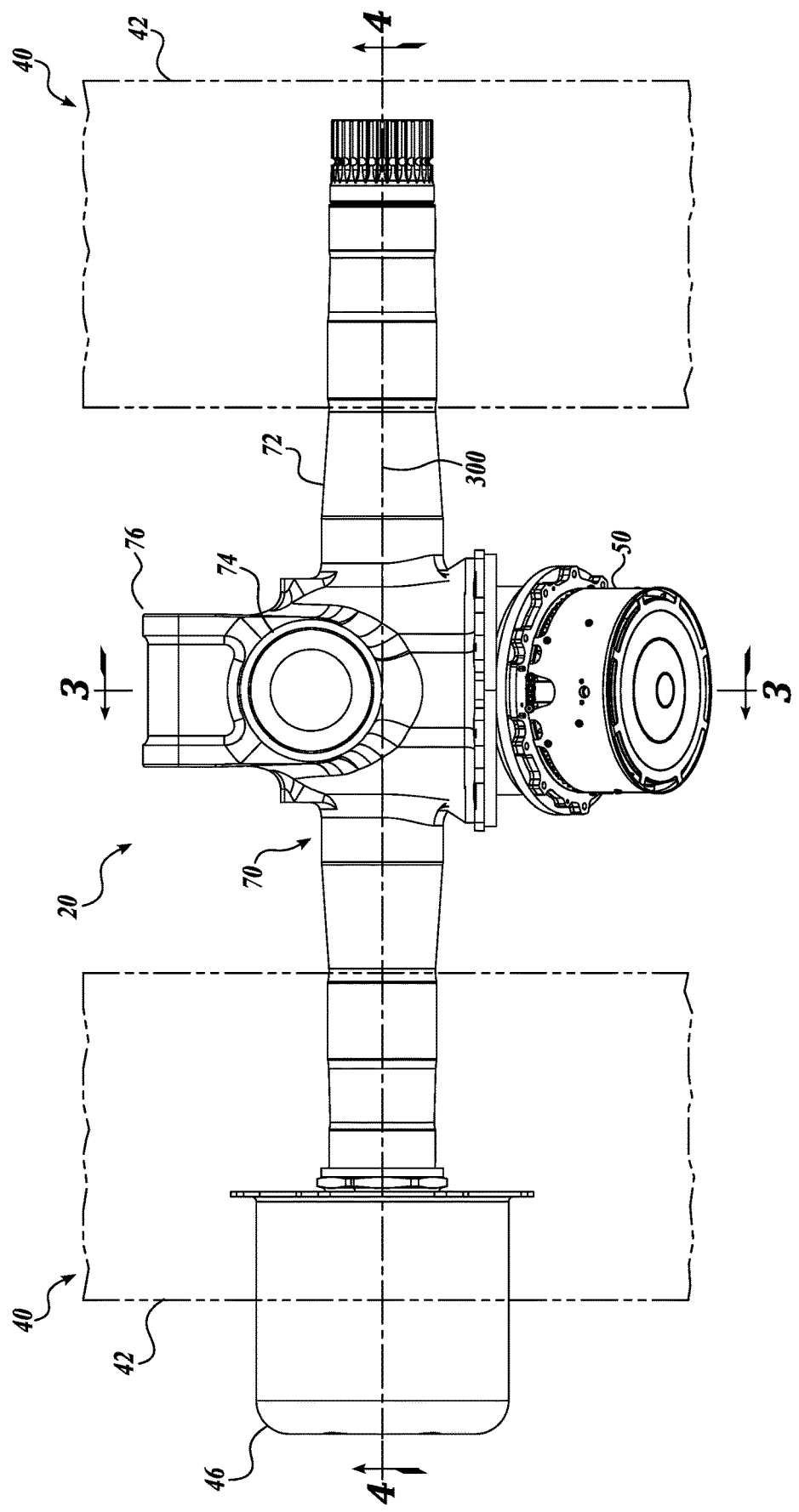
FIG. 2 shows a partial top plan view thereof.

Referring to FIGS. 1-10, a first representative embodiment of a landing gear system 20 according to the present disclosure is shown. As best shown in FIGS. 1 and 2, the landing gear system 20 includes a strut 30 and an axle assembly 70. One end of the strut 30 is coupled to the aircraft (not shown) and the other end of the strut is coupled to the axle assembly 70 at a strut interface 104 formed in an axle housing 72, as shown in FIG. 2. In the illustrated embodiment, the axle assembly 70 extends laterally outward from the strut 30 and has a wheel 40 rotatably mounted to each end. A motor 50 is mounted to a rear side of the axle housing 72. As explained in further detail, the motor 50 provides the driving force to rotate one or more of the wheels 40 to taxi the aircraft.

Figure 8:
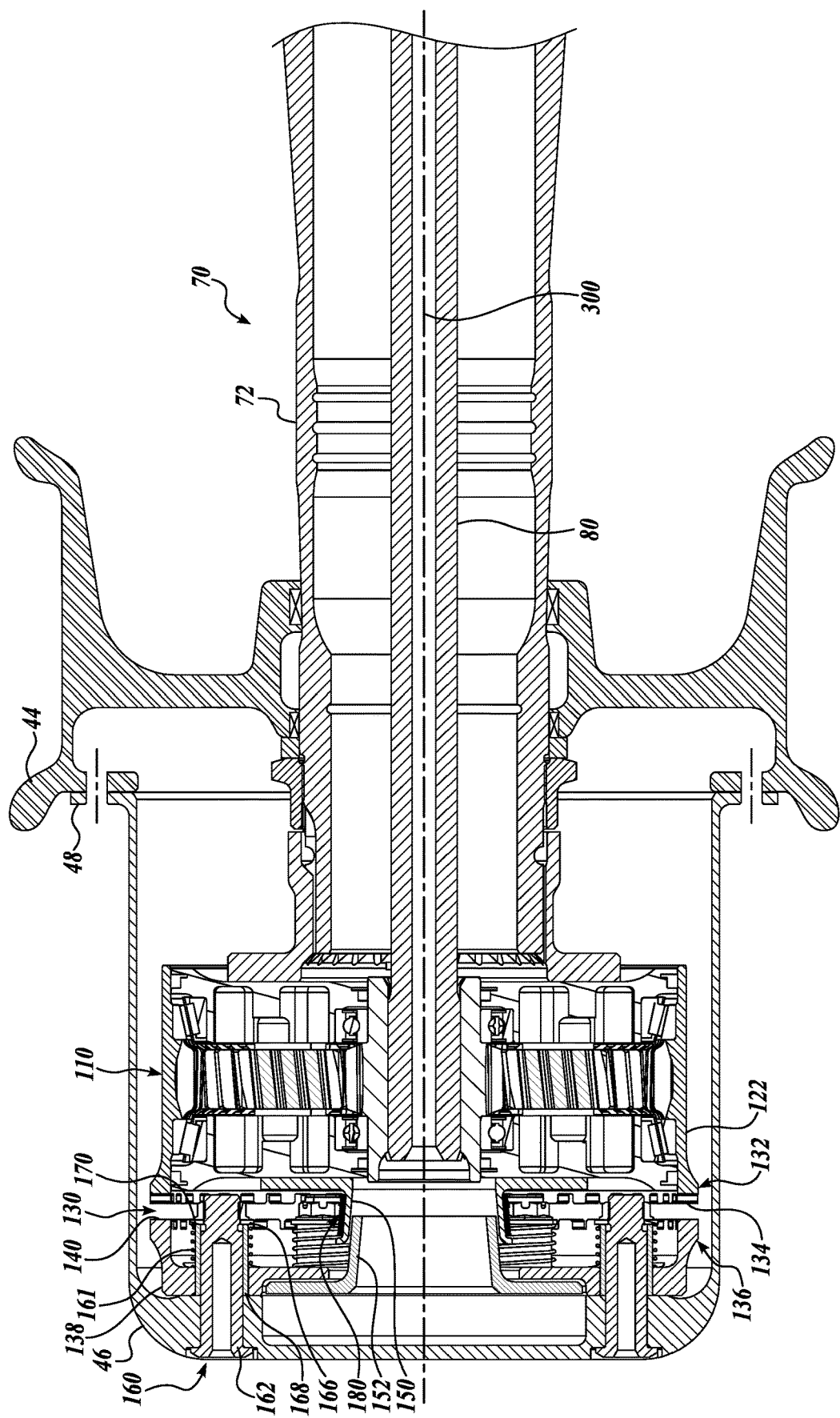
FIG. 8 shows a partial cross-sectional view of the drive assembly of the landing gear system of FIG. 1, as indicated in FIG. 6, wherein a clutch assembly is in a disengaged position.
Figure 9:
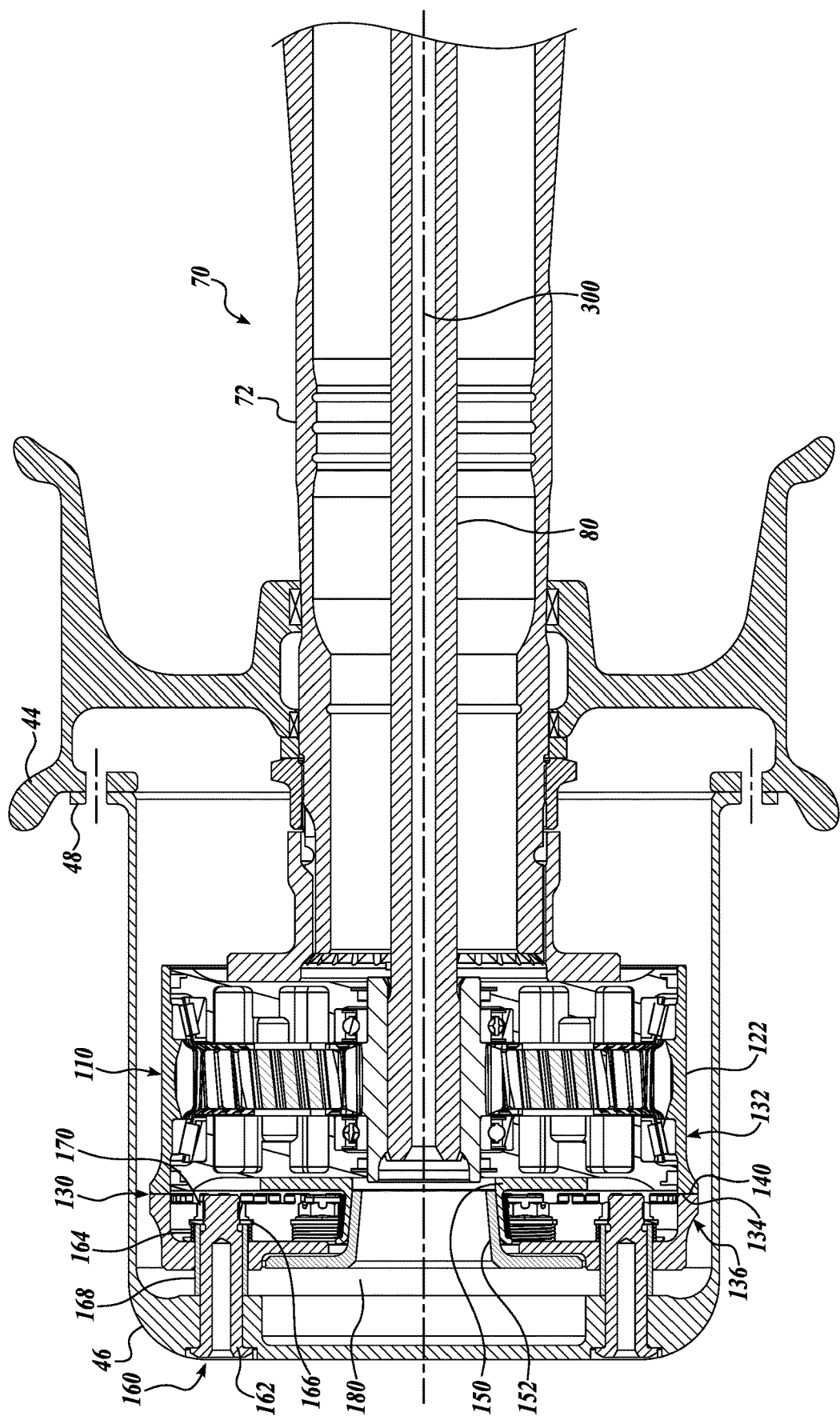
FIG. 9 shows a partial cross-sectional view of the drive assembly shown in FIG. 8, wherein a clutch assembly is in an engaged position.

Each wheel 40 includes a tire 42 mounted to a rim 44 (shown in FIGS. 8 and 9). At least one of the wheels 40 includes a hub 46 that is selectively rotated by the motor 50 to drive the wheel 40. A torque link lug 76 is formed on a forward end of the axle assembly 70 to provide attachment for the lower torque link of a torque link assembly (not shown), which is commonly used in known landing gear configurations.

The illustrated landing gear system 20 is a configuration similar to known main landing gear assemblies used on commercial aircraft. It will be appreciated, however, that the present disclosure is not limited to the illustrated landing gear system. In this regard, embodiments of the disclosed autonomous taxiing system can be utilized with various landing gear systems for different aircraft. In one embodiment the taxiing system is utilized with main landing gear assemblies mounted to the aircraft body or wings. In other contemplated embodiments, the taxiing system drives one or more wheels of a multi-wheel, e.g., four, six, eight, etc., landing gear assembly with a bogie beam. In yet another embodiment the taxiing system is used in conjunction with a single-wheel landing gear assembly. Embodiments are also contemplated in which the motor 50 is positioned forward of the axle assembly 70 or in another suitable location, and/or the torque link assembly is positioned aft of the axle assembly.

Figure 3:
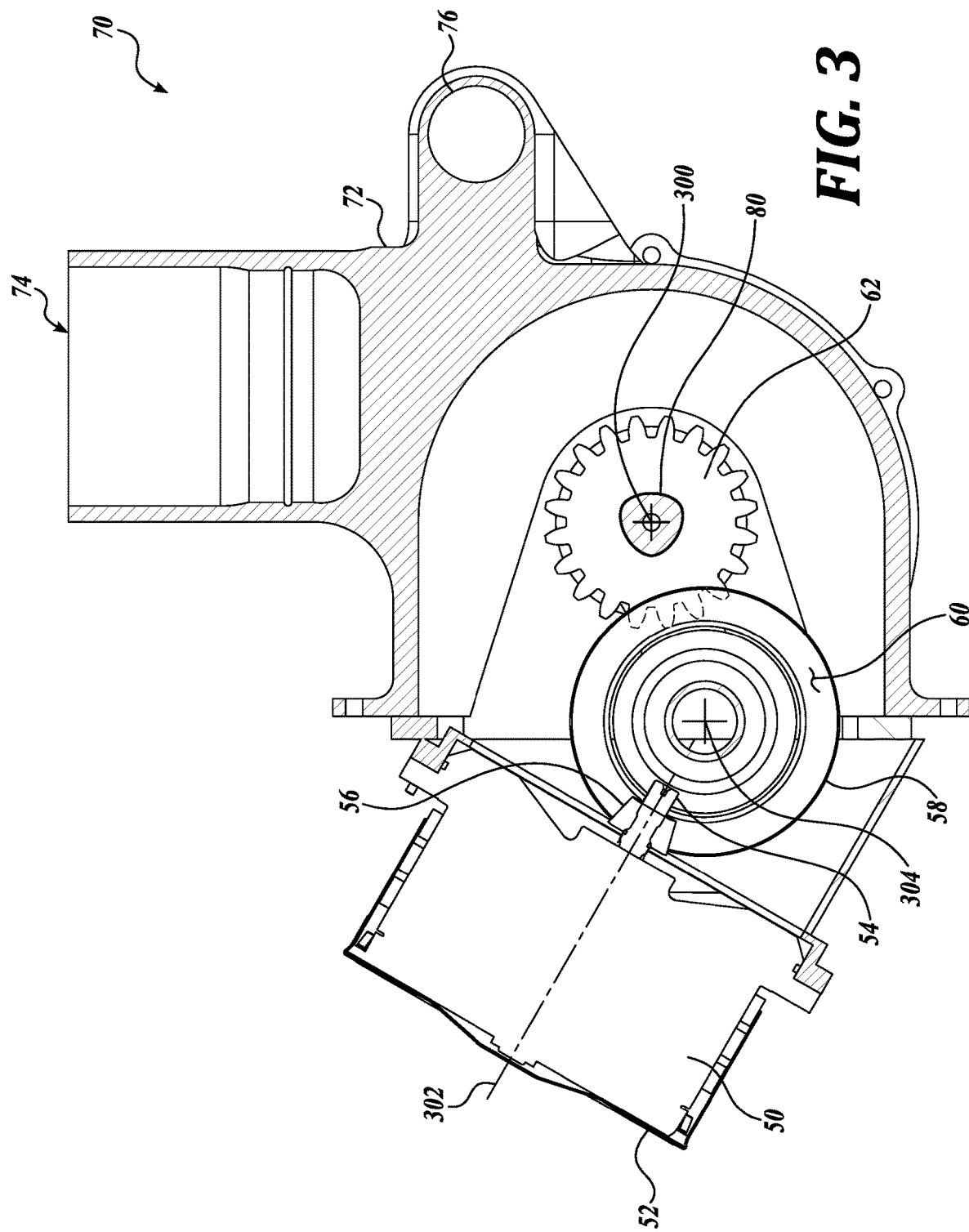
FIG. 3 shows a partial cross-sectional view of the landing gear system of FIG. 1, as indicated in FIG. 2.

Referring now to FIG. 3, which is a cross-sectional view of the system 20 taken along line 3-3 in FIG. 2, the motor 50 includes a housing 52 coupled to an aft side of the axle housing 72 by mechanical fasteners or other suitable means. The motor 50, which may be electric, hydraulic, or any other suitable type of motor, includes an output shaft 54 that selectively rotates about an axis 302. A bevel gear 56 is mounted to the output shaft 54 and engages teeth a face 60 of an intermediate gear 58. The intermediate gear 50 is mounted for rotation about an axis 304 and engages a drive shaft gear 62. The drive shaft gear 62 rotatably mounted within the axle housing 72 and engages a drive shaft 80 so that the rotation of the output shaft 54 of the motor 50 rotates the drive shaft gear 62 and the drive shaft 80 about a common axis 300.

In the illustrated embodiment, the portion of the drive shaft 80 that engages the drive shaft gear 62 has three lobes and nests within a similarly-shaped aperture in the drive shaft gear. In other contemplated embodiments, the drive shaft 80 may be mechanically fastened to or integrally formed with the drive shaft gear 62. Additional configurations may use different numbers and sizes of gears or other transmission elements to transform the output of the motor 50 into rotation of the drive shaft 80 about the axis 300.

Figure 4:
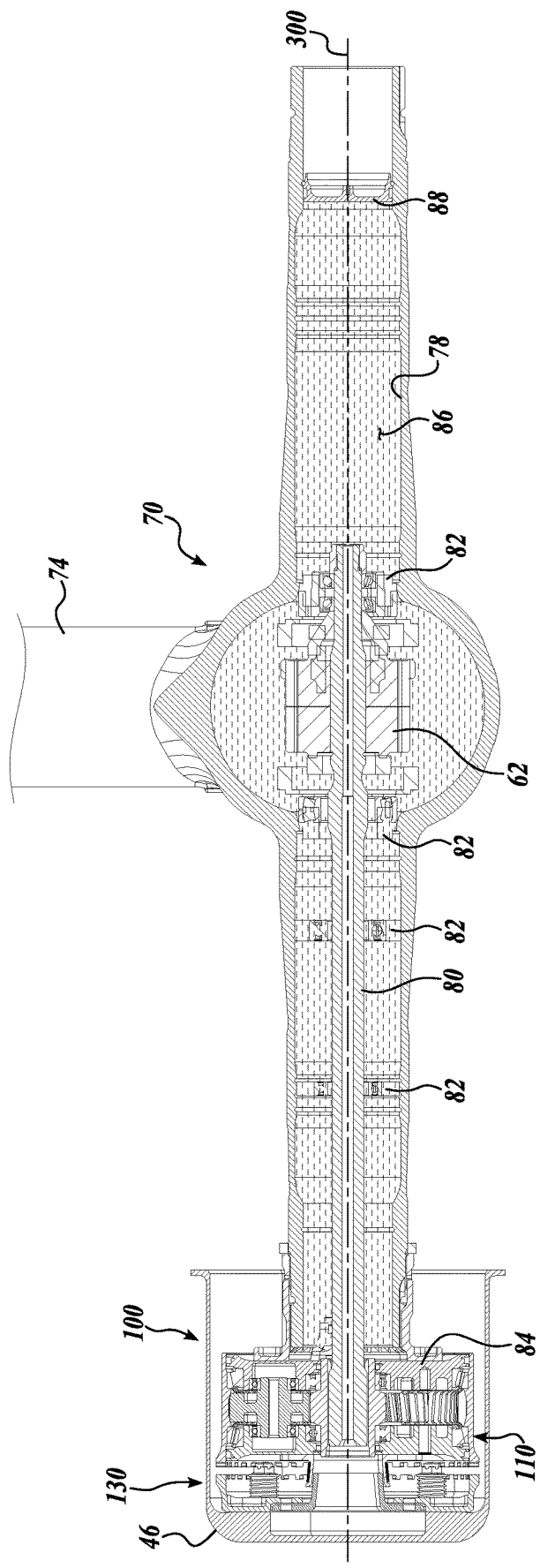
FIG. 4 shows a partial cross-sectional view of the landing gear system of FIG. 1, as indicated in FIG. 2.

FIG. 4 is a partial cross-sectional rear view taken along line 4-4 of FIG. 2, the landing gear system 20 is shown with portions of the wheels 40 removed for clarity. The axle housing 72 includes an elongate internal cavity 78. The drive shaft 80 is mounted within the cavity 78 via a plurality of bearings 82 to be rotatable about axis 300. In the illustrated embodiment, the cavity 108 is sealed at one end by a plug 88 mounted within the axle housing 72. The cavity 78 is fluid tight and filled with a fluid 86. In the illustrated embodiment, the fluid 86 is a lubricating oil that lubricates the internal components of the axle assembly 70.

A drive assembly 100 is positioned at one end of the axle assembly 70. A first end of the drive shaft 80 is operably connected to the motor 50 to receive rotational input, and a second end of the drive shaft 80 is operably connected to the drive assembly 100. The drive shaft 80 is configured to transfer rotational movement from the motor 50 to the drive assembly 100. More specifically, the drive shaft 80 transfers rotational movement to a planetary gear assembly 110, which selectively outputs the rotational movement to the wheel 40 through the hub 46 to provide motive force to the landing gear system 20.

Figure 5:
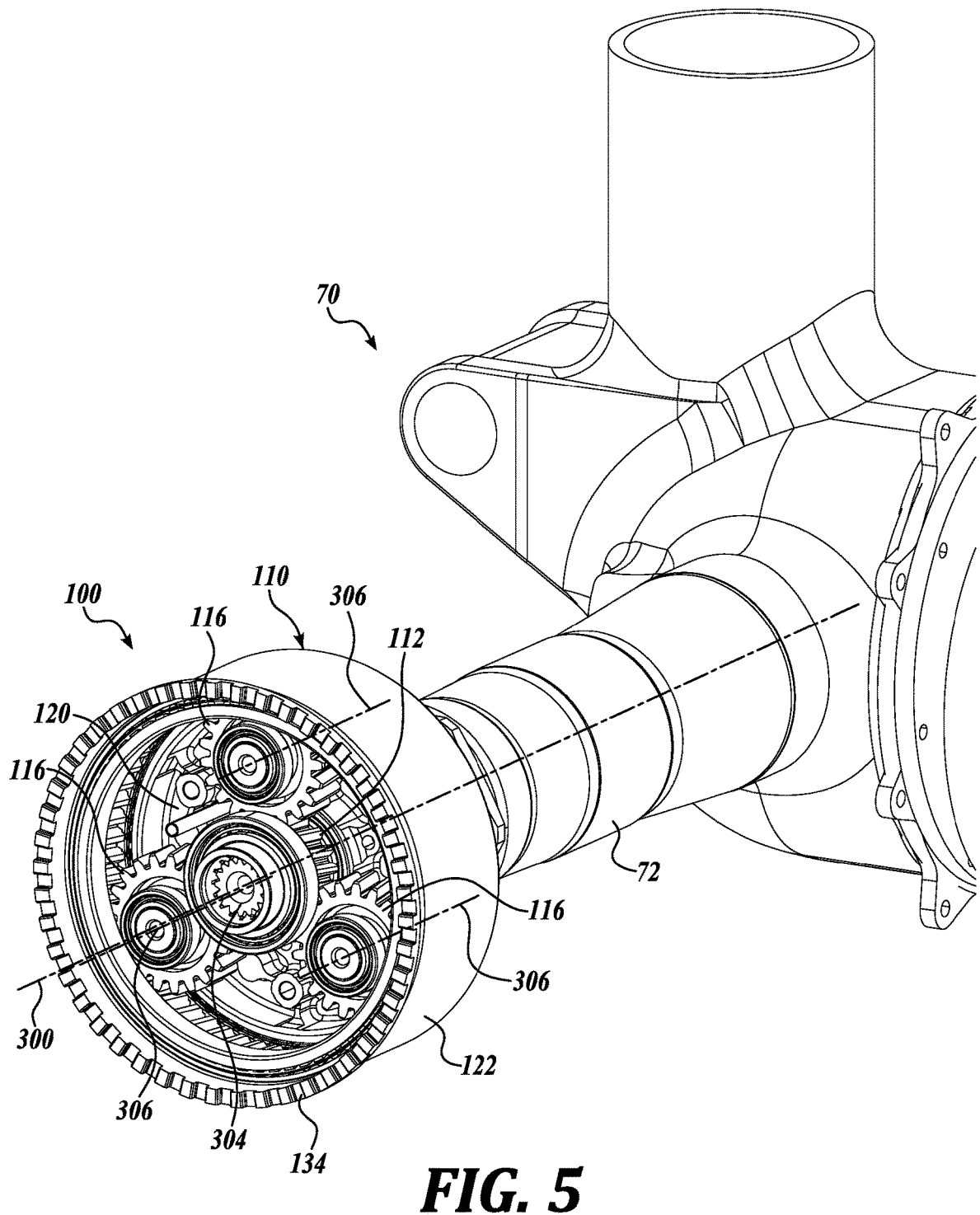
FIG. 5 shows a partial isometric view of a drive assembly of the landing gear system FIG. 1.
Figure 6:
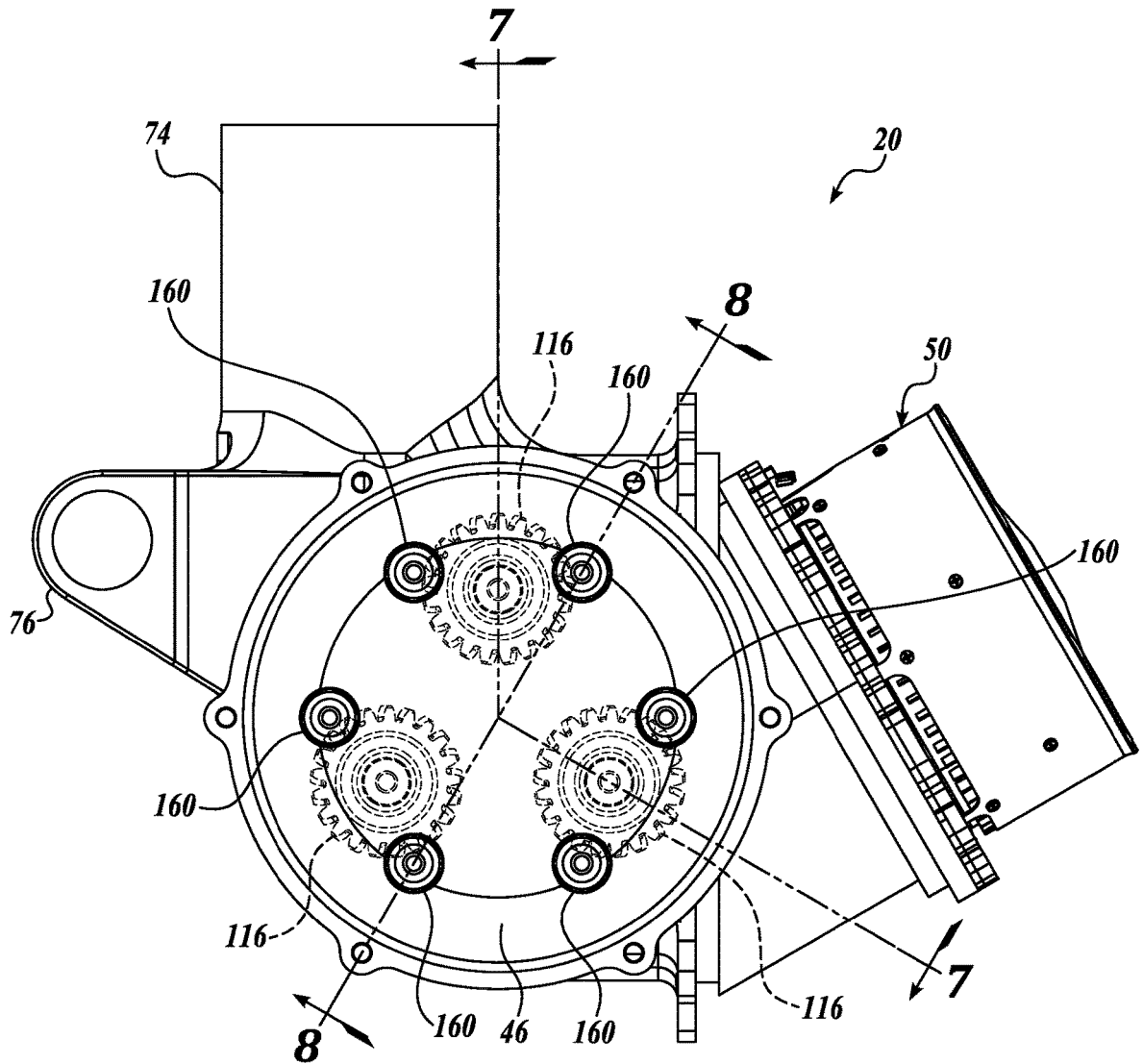
FIG. 6 shows a partial left side elevational view of the landing gear system of FIG. 1.

As shown in FIGS. 5 and 6, the drive shaft 80 rotates about axis 300 to drive a planetary gear assembly 110 that converts the high-speed/low-torque input from the drive shaft 80 into a low-speed/high-torque output that drives at least one wheel 40 of the landing gear assembly 20. As will be described in further detail, the planetary gear assembly 110 includes a sun gear 112, a plurality of planet gears 116, and a ring gear 122. The sun gear 112 receive rotational input from the drive shaft 80, and the ring gear 122 outputs rotational movement to the wheel 40. Rotational output of the ring gear 122 is selectively transferred to the wheel by engaging and disengaging a clutch assembly 130. The clutch assembly 130 includes an outboard clutch plate 132 that reciprocates along a plurality of slider assemblies 160 to engage and disengage an inner clutch plate 138.

Figure 7:
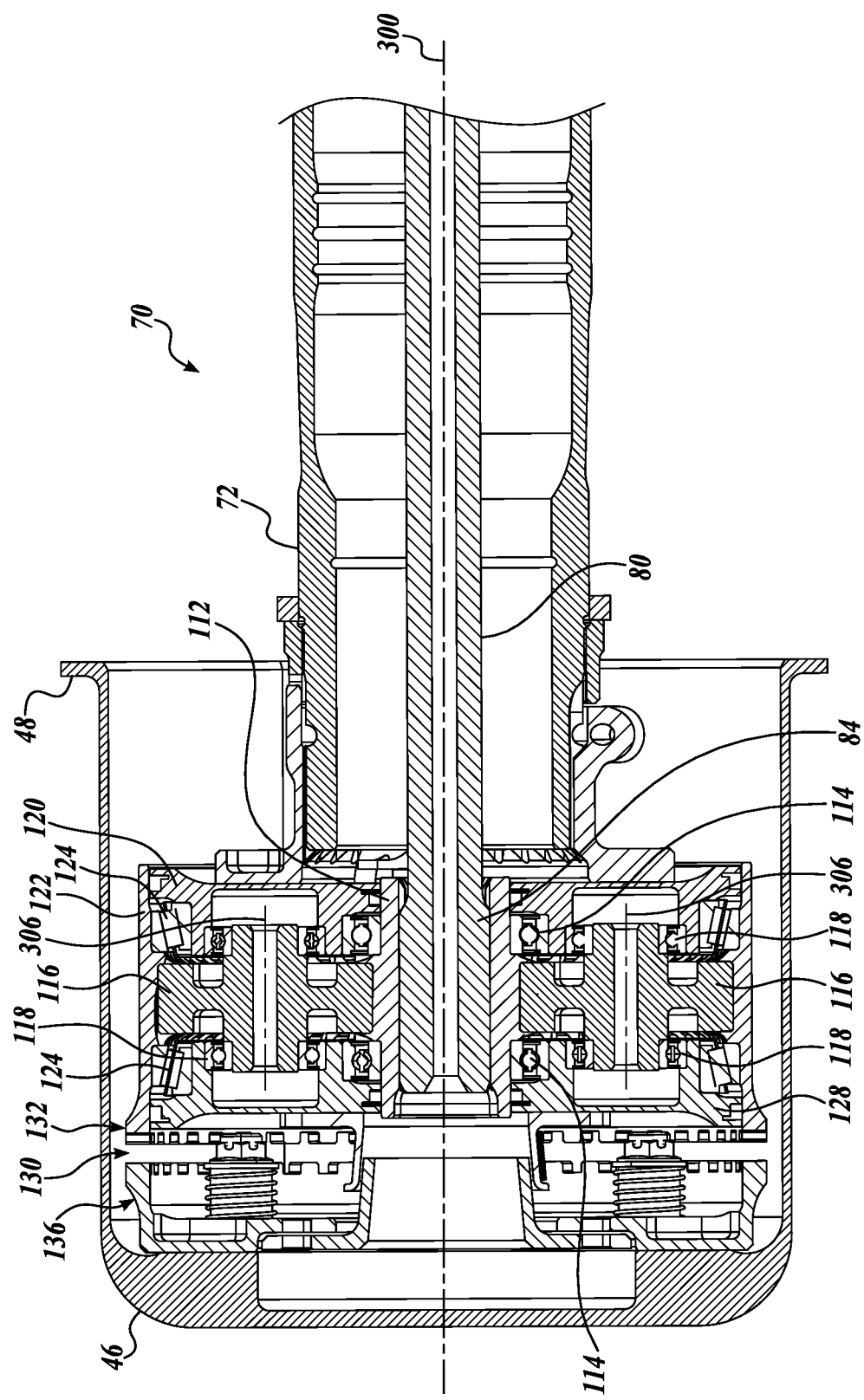
FIG. 7 shows a partial cross-sectional view of the drive assembly of the landing gear system of FIG. 1, as indicated in FIG. 6.

Referring now to FIGS. 5-7, an embodiment of the planetary gear assembly 110 will be described. The planetary gear assembly 110 includes a carrier 120 mounted to the axle housing 72 so that the carrier is fixedly positioned relative to the axle assembly. The planetary gear assembly 110 also includes a spider plate 128 mounted to and offset from the carrier 120. The spider plate 128 is fixedly positioned relative to the carrier 120. Thus, the carrier 120 and the spider plate 128 cooperate to provide a frame in which the moving elements of the planetary gear assembly 110 are mounted.

The sun gear 112 is mounted between the carrier 120 and the spider plate 128 by bearings 114. The sun gear 112, which is rotatably about axis 300 has splines formed on the inner diameter of the gear. The splines of the sun gear 112 engage splines 84 formed on the end of the drive shaft 80 so that rotation of the drive shaft imparted by the motor 50 rotates the sun gear about axis 300.

A plurality of planet gears 116 are positioned circumferentially around the sun gear 112. Each planet gear 116 is rotatably mounted to the carrier 120 and the spider plate 128 by one or more bushings 118. The external teeth of each planet gear 116 are in meshed engagement with external teeth of the sun gear 112 so that rotation of the sun gear about axis 300 rotates each planet gear about its respective axis of rotation 306. The axis 306 of each planet gear 116 is parallel to the axis 300 of the sun gear 112 and is fixedly positioned relative to the carrier 120 and the spider plate 128.

A ring gear 122 has a generally cylindrical shape and extends around the planet gears 116. The ring gear is mounted to the carrier 120 and the spider plate 128 for rotation about axis 300. In the illustrated embodiment, the ring gear 122 is mounted to the carrier 120 and the spider plate 128 by thrust bearings 124. Internal teeth are formed on the ring gear 122 and are in meshed engagement with each of the planet gears 116. Because the rotational axes 106 of the planet gears 116 are fixed relative to the carrier 120 and the spider plate 128, and therefore the axle housing 72, rotation of the planet gears rotates the ring gear about axis 300. The fixed position of the planet gear axes 106 also provide a static pathway through the planetary gear assembly 110 for electrical wiring, tubing, or other systems components.

The illustrated planetary gear assembly 110 is configured to have a gear ratio that converts the high-speed/low torque rotation of the drive shaft 80 about axis 300 into low-speed/high-torque rotation of the ring gear 122 about axis 300. It will be appreciated that the illustrated embodiment is exemplary only, and other configurations are possible. In some embodiments, the number and/or location of the planet gears 116 vary. In some embodiments, the planetary gear assembly 110 includes a single planet gear 116. In some embodiments, the carrier 120 and the spider plate 128 are integrally formed or include multiple components. These and other variations of known planetary gear assemblies 110 are contemplated and should be considered within the scope of the present disclosure.

Referring now to FIGS. 8 and 9, the drive assembly 100 includes a clutch assembly 130 that selectively engages and disengages the drive shaft 80 to one or more of the wheels 40. More specifically, the clutch assembly 130 of the illustrated embodiment is a curvic clutch that includes a first portion 132 associated drive shaft 80 and a second portion 136 associated the wheel 40. When the clutch assembly 130 is disengaged (FIG. 8), the wheel 40 turns independent of the drive shaft 80, and when the clutch assembly is engaged (FIG. 9) rotation of the drive shaft drives the wheel.

In the illustrated embodiment, the first clutch portion 132 is integrally formed with the planetary gear assembly 110. More specifically, a plurality of teeth 134 are formed with the outboard edge of the ring gear 122 so that the ring gear acts as the first clutch portion 132 of the clutch assembly 130. As such, the rotational output of the planetary gear assembly 110 derived from the rotary input of the drive shaft 80 is also the rotation of the first clutch portion 132. In some embodiments, the first clutch portion 132 is distinct from the ring gear 122 of the planetary gear assembly 110 and is coupled to or otherwise associated with the ring gear such that rotation of the ring gear rotates the first clutch portion.

The second clutch portion 136 is slidably mounted to the wheel hub 46 by a plurality of slider assemblies 160 that are configured to allow reciprocating translation of the second clutch portion in the inboard and outboard directions. As shown in FIG. 6, the illustrated embodiment, includes six slider assemblies 160 arranged circumferentially around the axis 300 of the wheel 40. In some embodiments, the number and position of the slider assemblies 160 have any suitable configuration.

The hub 46 is itself a component of the wheel 40 (see FIG. 2) and rotates with the wheel. More specifically, the illustrated hub 46 is a hubcap that is reinforced to be able to transfer torque loads from the second clutch portion 136 (through the slider assemblies 160) to the wheel 40. In another embodiment, the second clutch portion 136 is indirectly coupled to the wheel 40 by a known transmission, gearbox, or other suitable configuration that transfers rotation of the second clutch portion to the wheel 40.

Referring to FIGS. 8 and 9, Each slider assembly 160 includes a slider bolt 162 extending in the inboard direction through the hub 46. A cylindrical bushing 168 surrounds the bolt 162 on the inboard side of the hub 46, and a nut 170 engages the inboard end of the bushing 168 to clamp the bushing against an inboard surface of the hub, thereby fixedly positioning the bolt relative to the hub. The bolt 162 and the bushing 168 extend through a compression spring 164 that engages the second clutch portion 136 at one end and a spring stop 166 at the other end. In the illustrated embodiment, the spring stop 166 is a washer disposed between the bushing 168 and the nut 170. In some embodiments, the nut 170 acts as a spring stop.

An actuator 180 engages the second clutch portion 136 to selectively move the second clutch portion 136 toward the engaged position of FIG. 9 when the actuator is energized. When the actuator 180 is not energized, the spring 164 exerts a biasing force against the second clutch portion 136 that returns the second clutch portion to the disengaged position of FIG. 8. In the illustrated embodiment, the actuator 180 includes one or more magnetic actuators. In some embodiments, the actuator may include one or more solenoids, magnetic actuators, hydraulic actuators, or any other suitable actuators or combinations thereof that are utilized to move the clutch assembly 130 between the engaged and disengaged positions, and such configurations should be considered within the scope of the present disclosure.

Due to the large deflections of aircraft landing gear axles, there will sometimes be some misalignment of the first and second clutch portions 132 and 136. This misalignment can be angular as well radial. FIG. 8 shows an embodiment of a clutch assembly 130 with alignment features that align the first and second clutch portions 132 and 136 as the clutch assembly 130 moves from the disengaged position to the engaged position.

As shown in FIG. 8, a first alignment fitting 150 is coupled to the first clutch portion 132. The first alignment fitting 150 includes a base mounted to or integrally formed with the first clutch portion 132 and frustoconical recess extending in the inboard direction, i.e., away from the base and the second clutch portion 136.

A second alignment fitting 152 is coupled to the second clutch portion 136. The second alignment fitting includes a frustoconical protrusion corresponding to the frustoconical recess of the first alignment fitting 150.

As the clutch assembly 130 moves from a disengaged position to the engaged position, i.e., when the second clutch portion 136 moves toward the first clutch portion 132, the frustoconical portion of the second alignment fitting 152 is received by the frustoconical recess in the first alignment fitting 150, even in the presence of angular and/or radial misalignment. As the second clutch portion 136 continues to move toward the first clutch portion 132, the frustoconical portion of the second alignment fitting 152 engages the frustoconical recess in the first alignment fitting 150 to align the first and second clutch portions 132 and 136 as the clutch assembly 130 moves toward the engaged state.

Because of the sliding contact between the of the first alignment fitting 150 with the second alignment fitting 152 as the clutch assembly 130 engages and disengages, some embodiments will utilize dissimilar materials for the first and second alignment fittings. In an embodiment, one of the alignment fittings is formed from or coated with nitrided steel, and the other alignment fitting is formed from or coated with a copper alloy such as aluminum nickel bronze or spinoidally cast aluminum nickel tin. Other embodiments using other known materials suitable for interacting bearing surfaces are contemplated and should be considered within the scope of the present disclosure.

It will be appreciated that the illustrated alignment features are representative only and should not be considered limiting. In an embodiment, the positions of the first and second alignment fittings 150 and 152 are reversed, so that the alignment associated with the second clutch portion 136 receives the alignment fitting associated with the first clutch portion. In an embodiment, the recess formed in the first alignment fitting is conical, frustoconical, or any other suitable shape. These and other variations of fittings that align the first and second clutch portions 132 and 136 are contemplated and should be considered within the scope of the present disclosure.

Figure 10:
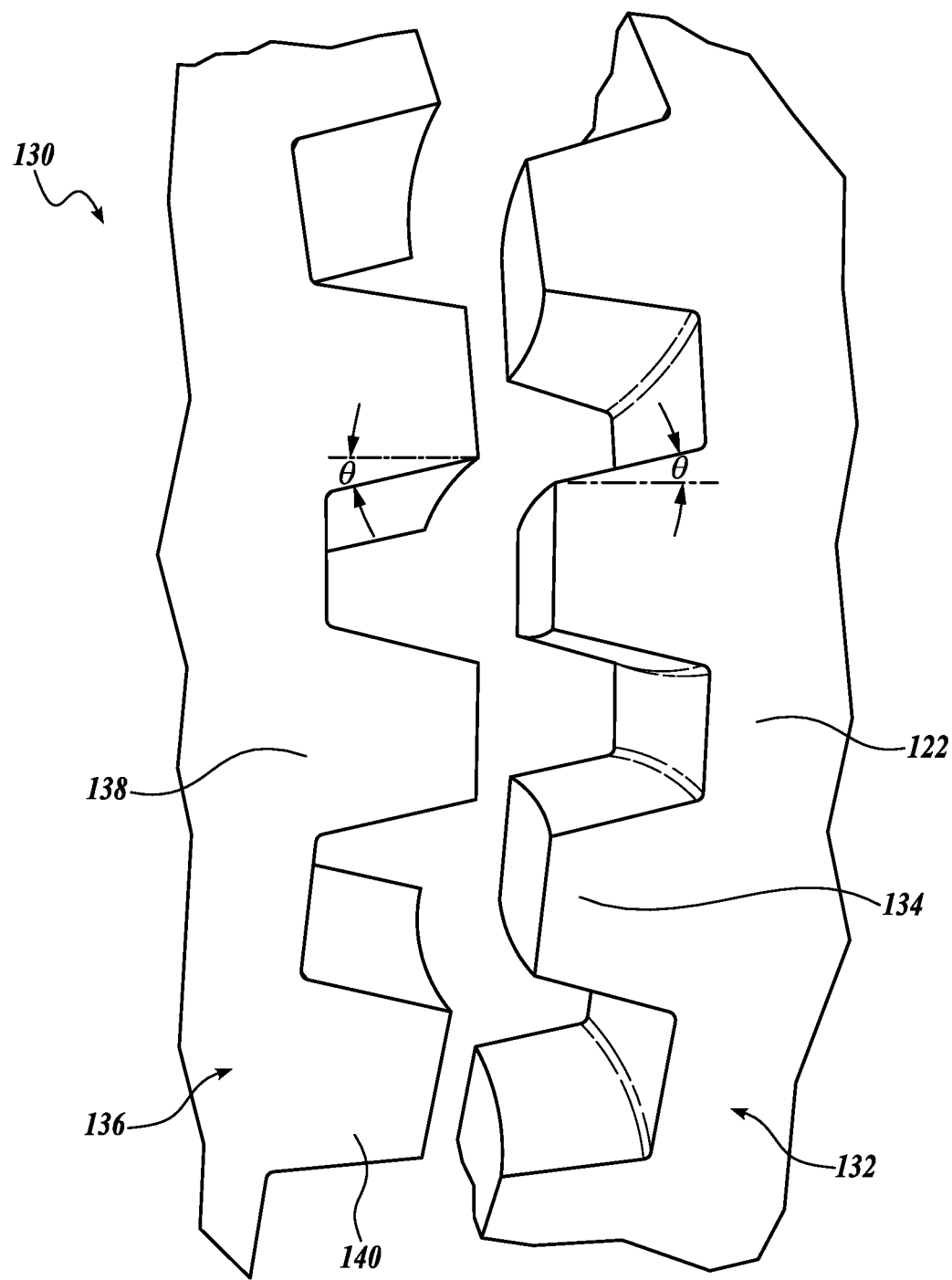
FIG. 10 shows a partial isometric view of a curvic clutch of the clutch assembly shown in FIG. 8.

In the illustrated embodiment, the clutch 140 is a curvic clutch of the type disclosed in U.S. Pat. No. 2,384,582, issued to Wildhaber on Sep. 11, 1945, and U.S. Pat. No. 6,672,966, issued to Muju et al. on Jan. 6, 2004, the disclosures of which are incorporated herein by reference. As best shown in FIG. 10, the first clutch portion 132 includes a plurality of teeth 136 formed so that the sides of the teeth are concave. The second clutch portion 136 has a corresponding plurality of teeth 140 formed so that the sides of the teeth are convex. When the first and second clutch portions 132 and 138 are engaged, each concave tooth surface on the first clutch portion mates with a corresponding convex tooth surface on the second clutch portion. The inclusion of mating concave and convex surfaces advantageously provides a self-centering coupling with larger contact surfaces between the clutch portions.

In the illustrated embodiment, the teeth 134 and 140 of the first and second clutch portions 132 and 138, respectively, have a tooth angle θ, which is the angle measured between the side of the tooth and a plane normal to the face the clutch (see FIG. 10). For embodiments with a straight cut set of teeth, i.e. teeth with a 0° tooth angle θ, if the clutch disengages under load, the actuator 180 must be sized to overcome the tooth friction load resulting from the tooth coefficient of friction and the normal force on the teeth (which is directly proportional to the applied shaft torque). With straight cut teeth there is no axial force applied to the mobile clutch as a result of shaft torque.

It will be appreciated that the teeth 134 and 140 of the clutch assembly 130 can be machined at any suitable angles. FIG. 10 shows another embodiment of a clutch 130 assembly with tooth angles greater than 0°. As tooth angles greater than 0° are utilized, a 'throw out' axial force is produced as a function of the torque applied by the drive shaft 80. This axial force acts to disengage the clutch assembly 130, which allows for the use of a smaller actuator 180. In one embodiment, the tooth angle is 7°. In another embodiment, the tooth angle is in the range of 5° to 15°.

In some embodiments, other types of clutches may be utilized and should be considered within the scope of the present disclosure. As one nonlimiting example, some embodiments may utilize a clutch that is a dog clutch.

To utilize the autonomous taxiing capabilities of the disclosed landing gear system 20, the actuator 180 drives the second clutch portion 136 inboard to engage the first clutch portion 132. With the clutch assembly 130 engaged, the motor 50 is selectively powered to drive one or more wheels 40 of the landing gear system 20. By using the motor 50 to drive the wheels 40 forward or backward, a pilot can taxi the aircraft without a tow tractor and without using the aircraft engines. When the taxiing is completed, the actuator 180 is de-energized, and the spring 164 moves the second clutch portion 136 outboard to disengage the second clutch portion from the first clutch portion 132. With the clutch assembly 130 disengaged, the wheels 40 of the aircraft are effectively isolated from motor 50 and other landing gear system components related to autonomous taxiing functionality.

Referring now to FIGS. 11-14, another representative embodiment of landing gear system 20 according to the present disclosure is shown. The landing gear system 20 is similar to the previously described landing gear system shown in FIGS. 1-10. In this regard, the landing gear system includes an axle assembly 70 with a motor 50 that rotates a drive shaft 80 to power a drive assembly 200. The drive assembly includes a planetary gear assembly 210 configured to convert high-speed/low-torque rotational input from the drive shaft 80 into low-speed/high-torque output to drive the one or more wheels 40 of the landing gear system 20. A clutch assembly 230 selectively engages and disengages to selectively connect the planetary gear assembly 210 to one or more wheels 40.

For the sake of brevity, the embodiment of FIGS. 11-14 will be described with the understanding that the landing gear 20 components are similar to those of the previously described landing gear 20 unless otherwise noted. Further, components identified with a reference number 2XX correspond to components of the previously described embodiment identified with reference number 1XX unless otherwise noted. For example, planetary gear assembly 210 corresponds to planetary gear 110 except as otherwise described.

Figure 11:
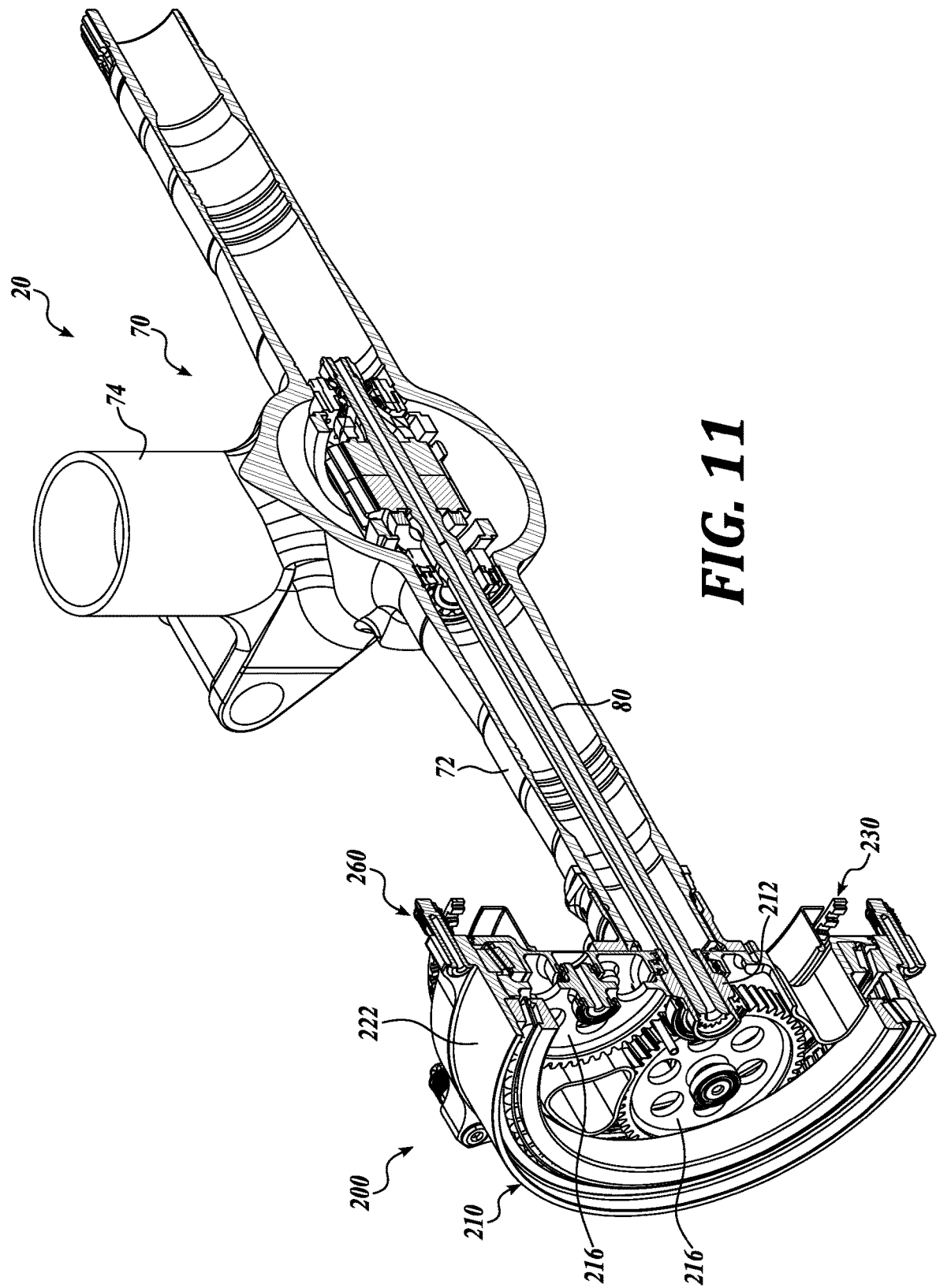
FIG. 11 shows a partial isometric cutaway view of a landing gear system according to a second representative embodiment of the present disclosure.

Referring to FIG. 11, the clutch assembly 230 is positioned inboard of the planetary gear assembly 210. This configuration provides a more compact arrangement than the embodiment of FIGS. 1-10.

Figure 12:
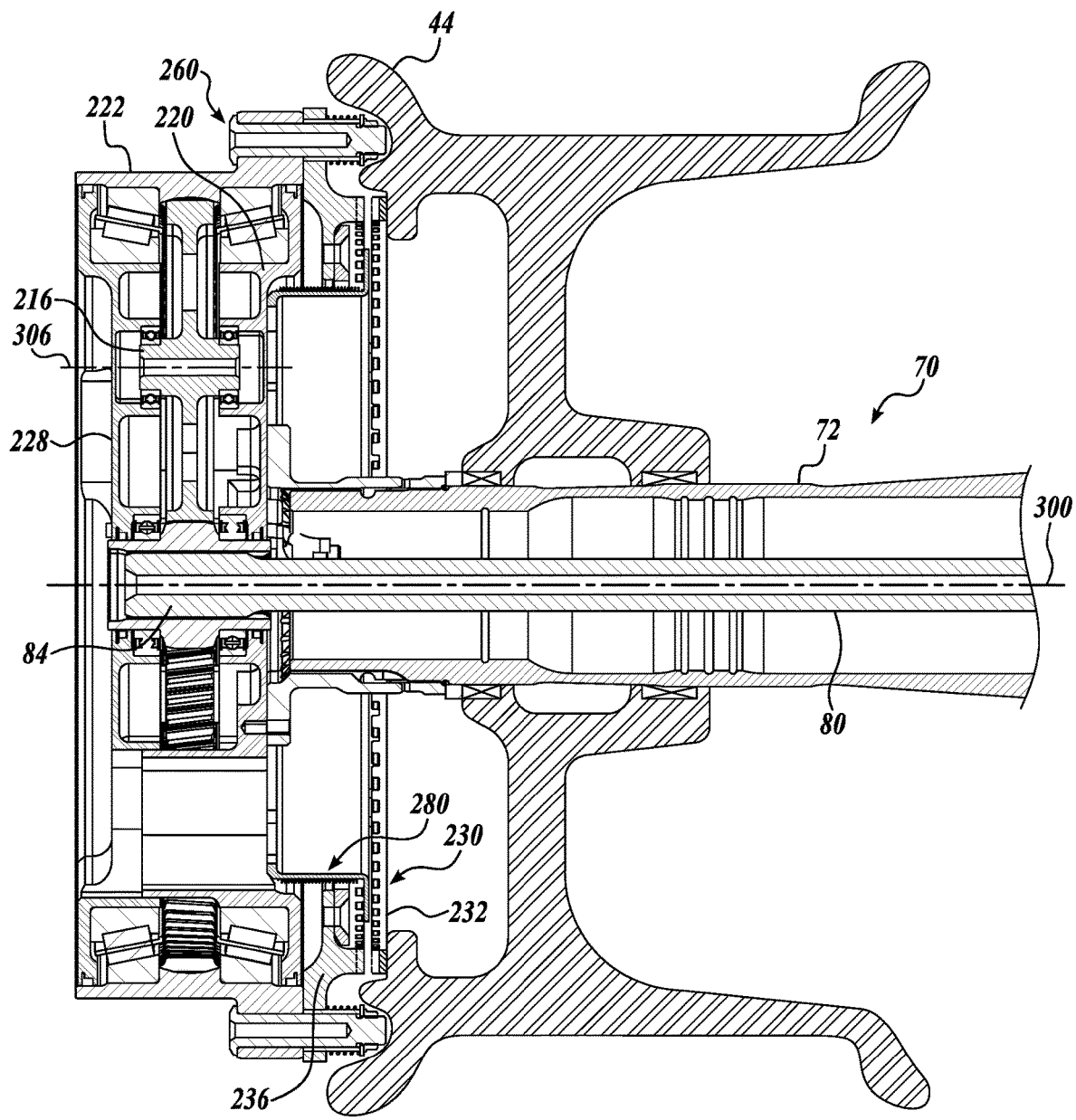
FIG. 12 shows a partial cross-sectional view of a drive assembly of the landing gear system of FIG. 11.
Figure 13:
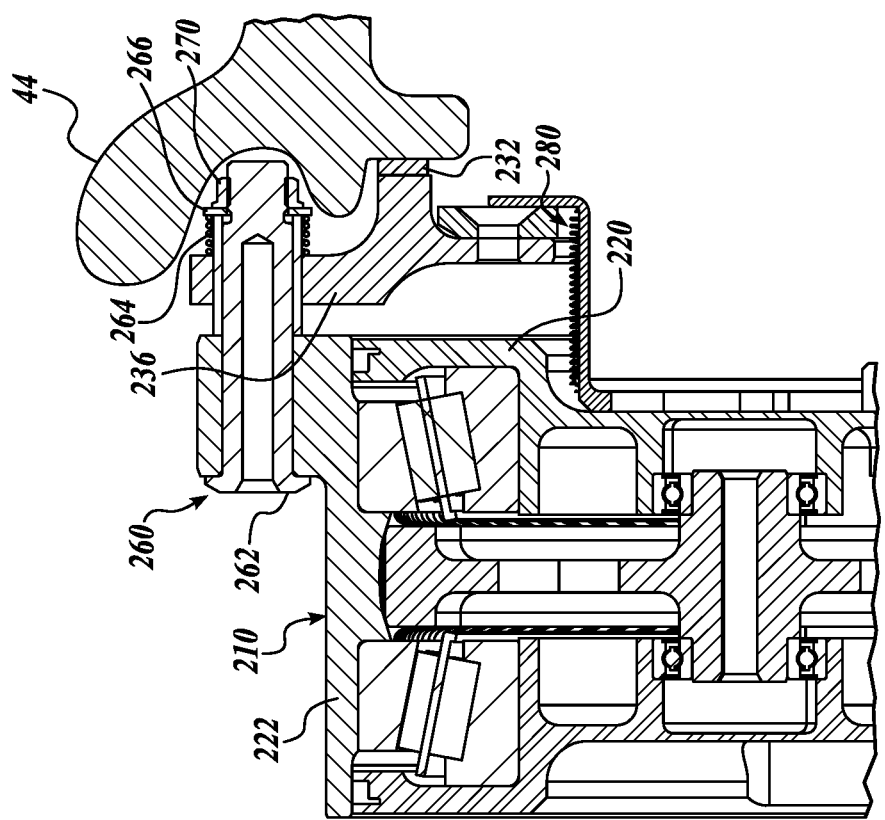
FIG. 13 shows a partial cross-sectional view of the drive assembly of the landing gear system of FIG. 11, wherein a clutch assembly is in a disengaged position.
Figure 14:
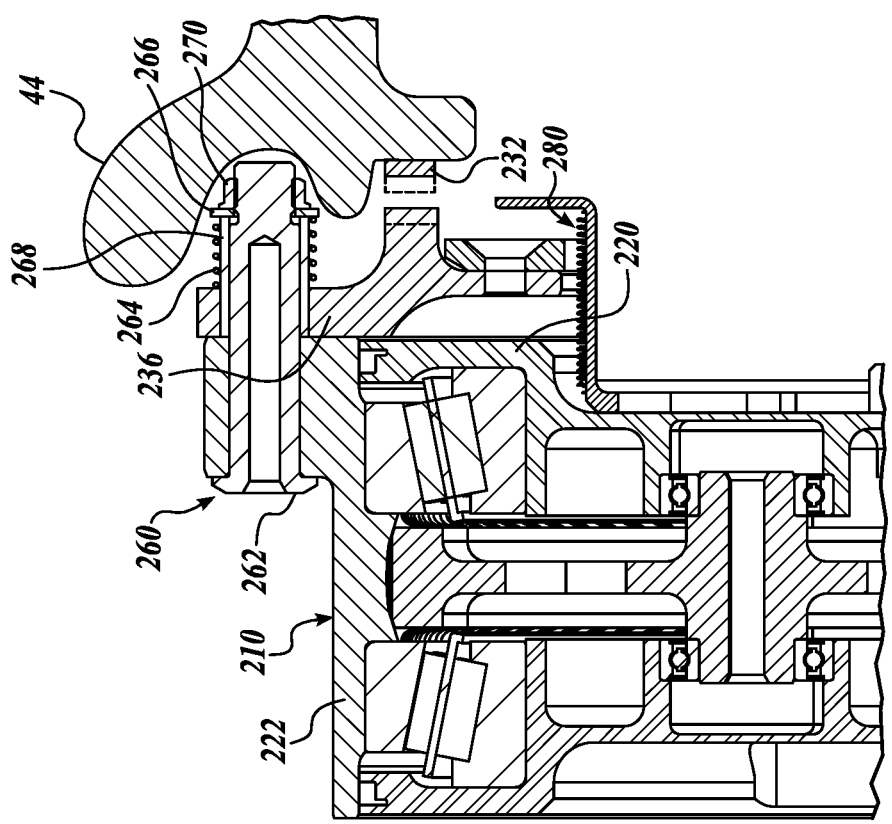
FIG. 14 shows a partial cross-sectional view of the drive assembly shown in FIG. 13, wherein the clutch assembly is in an engaged position.

As shown in FIGS. 12-14, the clutch assembly 230 includes a first clutch portion 232 fixedly coupled the rim 44 of the wheel. In some embodiments, the first clutch portion 232 is directly or indirectly coupled to the rim 44 by mechanical fasteners or other suitable configurations. In some embodiments, the first clutch portion 232 is integrally formed with the rim 44.

A second clutch portion 236 is slidably mounted to the ring gear 222 of the planetary gear assembly 210 by a plurality of slider assemblies 260. When the actuator 280 is de-energized, the clutch assembly 230 is in the disengaged position of FIG. 13, the springs 264 of the slider assemblies 260 maintain the second clutch portion 236 in an outboard position. When an actuator 280 is energized, the actuator drives the second clutch portion 236 in the inboard direction to engage the first clutch portion 232, as shown in FIG. 14. With the clutch assembly 230 so engaged, rotation of the ring gear 222 is transferred to the rim 44 to drive the wheel 44. When the actuator 280 is de-energized, the springs 264 urge the second clutch portion 236 outboard to disengaged position.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A landing gear system, comprising:
   an axle comprising an internal cavity;
   a wheel comprising a rim rotatably mounted to the axle;
   a hub mounted to the wheel and fixed in rotation relative to the rim;
   a drive shaft disposed within the cavity, the drive shaft being rotatable about an axis;
   a planetary gear assembly disposed within the hub and comprising:
      a sun gear operably coupled to the drive shaft;
      a planet gear operably engaging the sun gear; and
      a ring gear surrounding and operably coupled to the planet gear, the ring gear having a first plurality of gear teeth integrally formed on an outboard side of thereof, wherein rotation of the drive shaft rotates the ring gear; and
   a dog clutch assembly, comprising:
      a first clutch portion comprising the first plurality of gear teeth, and
      a second clutch portion fixedly positioned in rotation relative to the hub and comprising a second plurality of teeth associated with the wheel, wherein the dog clutch assembly is selectively moveable between an engaged state and a disengaged state, wherein the dog clutch assembly transfers rotation of the ring gear to the wheel when the dog clutch assembly is in the engaged state, and the dog clutch assembly does not transfer rotation of the wheel to the ring gear when the dog clutch assembly is in the disengaged state.

2. The landing gear system of claim 1, the planetary gear assembly further comprising a carrier fixedly positioned relative to the axle, wherein the sun gear and the planet gear are rotatably coupled to the carrier.

3. The landing gear system of claim 1, wherein the first plurality of teeth engage the second plurality of teeth when the dog clutch assembly is in the engaged state.

4. The landing gear system of claim 1, wherein the second plurality of teeth are integrally formed on an inboard face.

5. The landing gear system of claim 1, wherein the second clutch portion is selectively movable in translation relative to the hub.

6. The landing gear system of claim 1, wherein the second clutch portion is mounted for translation relative to the first clutch portion.

7. The landing gear system of claim 3, wherein the second clutch portion is fixed in rotation relative to the wheel.

8. The landing gear system of claim 7, wherein the second clutch portion is mounted for translational movement relative to the ring gear.

9. The landing gear system of claim 7, further comprising a plurality of slider assemblies fixedly positioned relative to the ring gear, wherein the second clutch portion is slidably mounted to the plurality of slider assemblies.

10. The landing gear system of claim 9, each slider assembly comprising a bolt extending through a corresponding hole in the second clutch portion.

11. The landing gear system of claim 10, each slider assembly further comprising a spring engaging the second clutch portion to urge the dog clutch assembly toward the disengaged state.

12. The landing gear system of claim 3, further comprising a plurality of slider assemblies fixedly mounted to the hub, wherein the second clutch portion is slidably mounted to the plurality of slider assemblies.

13. The landing gear system of claim 12, each slider assembly comprising a bolt extending through a corresponding hole in the second clutch portion.

14. The landing gear system of claim 13, each slider assembly further comprising a spring engaging the second clutch portion to urge the dog clutch assembly toward the disengaged state.

15. A landing gear system, comprising:
a drive shaft disposed within an axle housing of an axle and rotatable about a first axis;
a wheel rotatably mounted to the axle for rotation about the first axis;
a planetary gear assembly, comprising:
 a carrier fixedly coupled to the axle housing;
 a sun gear coupled to the carrier for rotation about the first axis and engaging the drive shaft, wherein rotation of the drive shaft rotates the sun gear about the first axis;
 a plurality of planet gears operably engaging the sun gear, each planet gear being mounted to the carrier for rotation about a corresponding planet gear axis parallel to the first axis; and
 a ring gear coupled to the carrier for rotation about the first axis, the ring gear surrounding and engaging each of the plurality of planet gears, rotation of the drive shaft rotating the ring gear; and
a dog clutch assembly selectively engaging the ring gear with the wheel.

16. The landing gear system of claim 15, wherein the dog clutch assembly includes a first clutch portion associated with the ring gear and a second clutch portion associated with the wheel.

17. The landing gear assembly of claim 16, wherein the first clutch portion is integrally formed with the ring gear, and the second clutch portion is slidingly associated with the wheel, the landing gear assembly further comprising an actuator configured to selectively move the second clutch portion to engage the first clutch portion.

18. The landing gear assembly of claim 16, wherein the first clutch portion is slidably associated with the ring gear, and the second clutch portion is fixedly positioned relative to the wheel, the landing gear assembly further comprising an actuator configured to selectively move the first clutch portion to engage the second clutch portion.

19. The landing gear assembly of claim 16, further comprising a first alignment fitting fixedly positioned relative to the first clutch portion and a second alignment fitting fixedly positioned relative to the second clutch portion, wherein the first alignment fitting engages the second alignment fitting when the dog clutch assembly moves from a disengaged state to an engaged state.

20. The landing gear assembly of claim 19, wherein the first alignment fitting comprises a first frustoconical surface, and the second alignment fitting comprises a second frustoconical surface, the first frustoconical surface engaging the second frustoconical surface when the dog clutch assembly is in the engaged state.

* * * * *